(12) United States Patent
Vincken et al.

(10) Patent No.: US 6,492,159 B1
(45) Date of Patent: Dec. 10, 2002

(54) CLOUDY FRUIT JUICES AND METHODS FOR MAKING SAME

(75) Inventors: Jean Paul Vincken, Renkum (NL); Gerrit Beldman, Wageningen (NL); Alphons Gerard Joseph Voragen, Wageningen (NL)

(73) Assignee: DSM N.V. (NL)

( * ) Notice: Subject to any disclaimer, the term of this patent is extended or adjusted under 35 U.S.C. 154(b) by 0 days.

(21) Appl. No.: 09/319,790

(22) PCT Filed: Dec. 10, 1997

(86) PCT No.: PCT/EP97/07139

§ 371 (c)(1), (2), (4) Date: Jul. 19, 1999

(87) PCT Pub. No.: WO98/28991

PCT Pub. Date: Jul. 9, 1998

(30) Foreign Application Priority Data

Dec. 11, 1996 (EP) .............................. 96203515

(51) Int. Cl.$^7$ ................................ C12N 9/42
(52) U.S. Cl. ...................................... 435/209
(58) Field of Search .................. 435/232, 201, 435/205, 210, 209, 275, 175; 426/50, 51, 52

(56) References Cited

FOREIGN PATENT DOCUMENTS

WO          94/14953      *  7/1994

OTHER PUBLICATIONS

Vincken et al., Ph.D. "Zyloglucan Endotransglycosylase Activity in Apples In Ripening–Related: Implications for Fruit Juice Processing", Thesis, Enzymic Modification of Cellulase–Xyloglucan Networks. Chpt. 9, Jan. 1996.

Nakamura S. et al., "Cloning and Sequencing of a cDNA for Poplar Endo–1,4–β–Glucanse", Plant Cell Physiol. 36, 1229–1235, Jan. 1995.

Beldman et al., "Purification, Characterization and Comparison of all Detectable Endoglucanases, Exoglucanases and β–glucosidases", Eur. J. Biochem. 146, 301–308, Jan. 1985.

Ito et al., "Transformation of Intact Yeast Cells Treated with Alkali Cations", J. Bact. 153, 163–168 Jan. 1983.

Somogyi "Notes on Sugar Determination", J. Biol. Chem. 195, 19–23, Jan. 1952.

Vincken et al., "The Effect of Xyloglucans on the Degradation of Cell–Wall–Embedded Cellulose by the Combined Action of Cellobiohydrolase and Endoglucanases . . . ", Plant. Physiol. 104, 99–107, Jan. 1994.

* cited by examiner

Primary Examiner—Keith Hendricks
(74) Attorney, Agent, or Firm—Morrison & Foerster LLP

(57) ABSTRACT

An enzyme preparation composition comprising a mixture of enzymes comprising an enzyme with homogalacturonan activity, more specifically pectin lyase, and an enzyme with endoglucanase activity, wherein the enzymes are in relative proportions to produce cloud volume from fruit or vegetable material. The preparation is such that enzymes which reduce the cloud volume by more than 5% are excluded, and wherein the endoglucanase has both CMCase activity and xyloglucanase activity in a ratio of at least 0.7.

4 Claims, 2 Drawing Sheets

CLOUDY FRUIT JUICES AND METHODS FOR MAKING SAME

FIELD OF THE INVENTION

The instant invention relates to cloudy juices and methods for making same. The invention is particularly concerned with cloudy juices from pomaceous fruit. The invention is further concerned with cell wall—cloud—material obtainable by a method according to the invention and uses thereof. The invention also concerns enzyme preparations which can suitably be used for the preparation of cloud material and/or juice containing said cloud material.

BACKGROUND OF THE INVENTION

Liquefaction is a process which is frequently used for the manufacturing of clear apple juice. The process aims at a complete degradation of cell walls using cell wall degrading enzymes. This process can be realized by treating apples with an appropriate pectolytic enzyme, for instance pectin lyase (PL), in combination with a crude cellulase preparation, containing several endoglucanases, cellobiohydrolase (CBH) and several other activities.

A process for making a cloudy apple juice has been described in Vincken et al. (1996, PhD Thesis, *Enzymic Modification of Cellulase-Xyloglucan Networks*, Wageningen Agricultural University, The Netherlands, Chapter 9) by partial degradation of apple cell walls. This yields a suspension of eroded apple cells which is mainly composed of cellulose and xyloglucan. It is unknown why these cellulose-xyloglucan complexes do not precipitate like cellulose particles do. It is thought that the xyloglucan molecules play a role in stabilization.

By this process Vincken et al. have been able to produce a cloudy apple juice on a small scale, using pectin lyase and small amounts of a crude cellulase preparation and ripe apples. The use of ripe apples is thought to be important in this process, because these contain large amounts of xyloglucan endotransglycosylase (XET). It is thought that a small amount of xyloglucanase is required to trigger the depolymerizing action of XET. The XET then weakens the apple cell wall, facilitating juice release but leaving the major part of the cellulose-xyloglucan network intact. A too large dose of cellulase destroys the cloud.

From an industrial point of view, the process above has two important drawbacks. Firstly, the enzyme formulation used in this process apparently contains components that are detrimental for cloud stability. Secondly, the balance between fungal glucarases and endogenous XET, is very important in order to obtain a cloudy juice. However, this balance is difficult to manage in practice as it requires knowledge of the endogenous XET-levels. No methods are known to determine such levels in an industrial context and the method is difficult to reproduce, even on a small scale. A further disadvantage, associated with the use of ripe apples, resides in their susceptibility to fungal attack. Fungi, such as Penicillium produce mycotoxins, which end up in the juice.

Another method for making a cloudy apple juice is disclosed in WO 95/34223. The method herein disclosed involves the use of enzymes that attack the hairy regions of the pectin backbone, such as rhamnogalacturonase (RGase), rhamnogalacturonan acerylescerase (RGAE), galactanase, and combinations thereof. A strong warning is expressed against the use of homogalacturonan degrading enzymes as they would destroy cloud stability (vide page 10, Experiment 4, page 6, 11, 13 to 16).

It is an object of the invention to provide a reproducible method for making cloudy apple juice which can be practiced on an industrial scale.

SUMMARY OF THE INVENTION

It was surprisingly found that a cloudy apple juice is obtained when a method is used comprising the step of treating apple material with a mixture of enzymes comprising a homogalacturonan depolymerizing activity, such as pectin lyase (EC 4.2.2.10), and an enzyme with endoglucanase activity (EC 3.-2.1.4), in the absence of enzymes which reduce the cloud volume by more than 25%, as determined by a method which comprises:

(a) suspending 5 mg of a cloud material
  obtainable by homogenizing 1 g of apple pieces of *Malus malus* L. cv. Jonagold, after removal of the peel and core, using a Braun Kitchen machine (MX32, Frankfurt, Germany; 5 mm blade), incubating at 40° C. under continuous head-over-tail mixing at 150 rpm in 3 mL of a 200 mM NaOAc buffer (pH 4) containing 0.01% (w/v) NaN3, 1% ascorbic acid, 50 mU pectin lyase and an amount of endoglucanase with an equivalent of 25 mU of xyloglucanase activity,
  in 3 ml of a 25 mM NaOAc buffer (pH 5), containing about 0.01% (w/v) NaN3, (b) Incubating the cloud suspension so obtained for 1 h at about 40° C., in the presence of the said enzyme, during which the cloud suspension and enzyme is mixed head-over-tail, (c) allowing the cloud to settle at about 40° C. for 24 hours, and (d) determining the effect of the enzyme on cloud stability by calculating the difference between the cloud volume or the cloud suspension obtained by following the above steps in the absence of the said enzyme and subtracting the volume obtained of the cloud suspension obtained by following the above steps in the presence of the enzyme.

By the use of this test, enzyme cocktails in which undesirable enzymes are absent have been developed. The enzyme preparations are characterised by the presence of an endoglucanase having CMCase activity, preferably a CMCase activity to xyloglucanase activity ratio of at least 0.7, and an enzyme having homogalacturonan depolymerizing activity such as a combination of pectin esterase and polygalacturonase, preferably pectin lyase.

In principle, there is no upper limit to the ratio (endoI in Table 1 has a CMCase/XGase ratio of about 114 and performs very well in a process for making a cloudy juice according to the invention; the CMCase activity is by far the most important in the partial apple liquefaction of apple material, but it cannot be concluded that XGase activity is absolutely redundant).

By using a method according to the invention, enzymes of the crude cellulase preparation which destroy cloud stability can be identified. Accordingly, a preferred embodiment of the invention is a process which is essentially free from cellobiohydrolase activity (EC 3.2.1.91).

The invention is further illustrated by the following figure(s).

DETAILED DESCRIPTION

Figure 1:
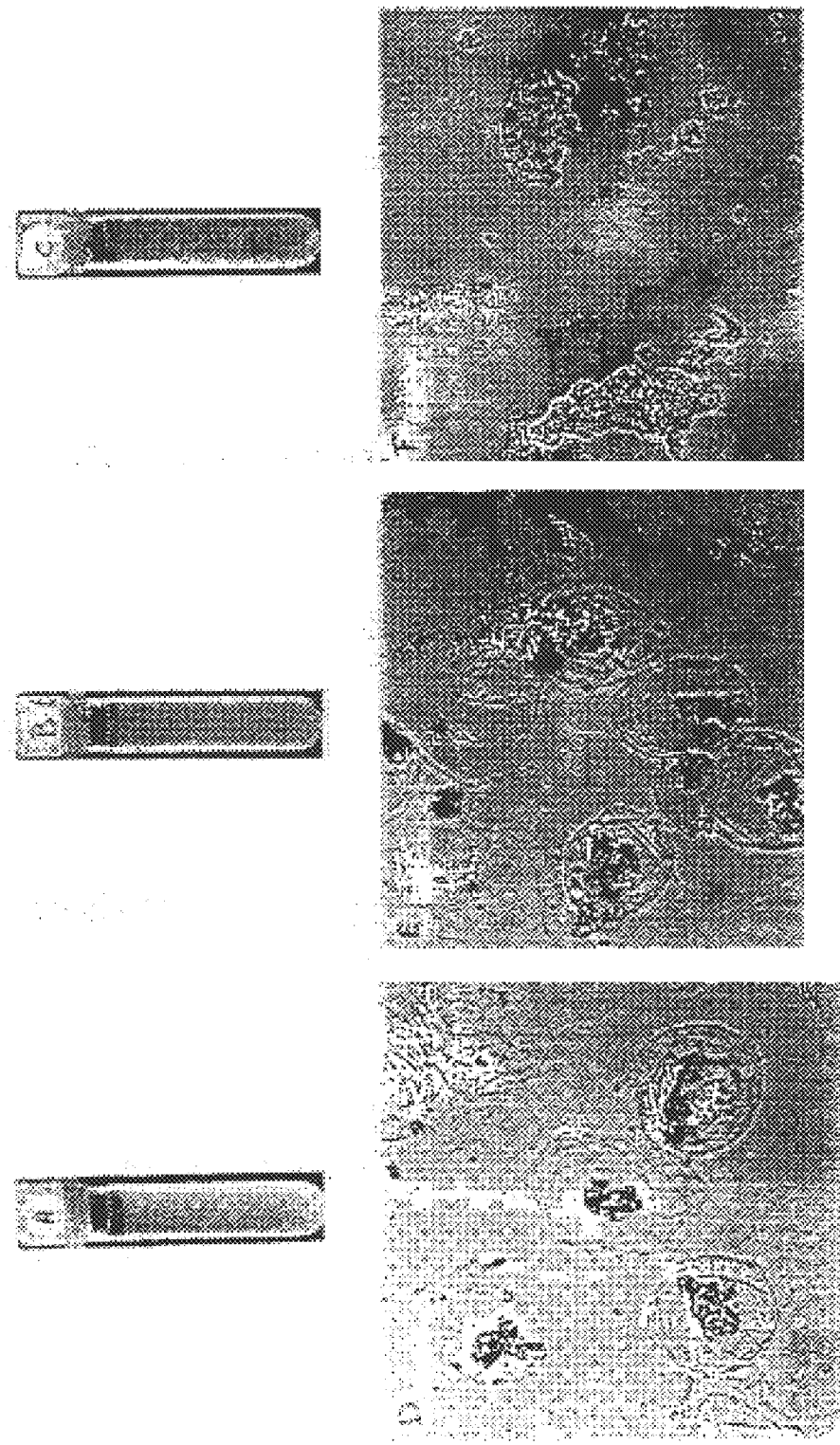
FIG. 1. Cloud material (A,D) treated with endoV (B,E) or a combination of endoV and CBH (C,F). Arrow heads in C indicate agglomerates that are formed upon addition of CBH. Scale bar in D-F represents 100 μm. EndoV is used as an example treatment of isolated cloud material with other endoglucanases gave similar results.

Enzymes having CMCase activity which can suitably be used are preferably selected from the group consisting of EndoI, EndoIV, EndoV (EC 3.2.1.4) from *Trichoderma reesii* (which is the same as *Trichoderma viride*), and celA from *A. niger*. However, it will be clear that the invention is not limited to these endoglucanases, as other suitable enzymes having CMCase may be found in organisms, including plants, such as pea (Nakamura S. et al., 1995, Plant Cel. Physiol. 36, 1229–1235), fungi, yeast and bacteria. The enzymes are preferably obtainable from fungi such as Trichoderma, Aspergillus, such CelA and CelB from *A. niger* described herein, egII and egIII from *Aspergillus aculeatus* as described by Dalboege H. et al., (1994, WO 94/14953), Fusarium, Botrytis and Humicola. Preferably, but not necessarily, the ratio of CMCase activity to xyloglucanase activity should be in excess of 0.7, as CMCase activity is more important than xyloglucanase activity in the process according to the invention.

The endoglucanases according to the invention preferably have a pH optimum above 2 and below 7. Preferably, the pH optimum is below 6, such as 5 or lower, or 3.5. The enzyme may be chosen in accordance with the pH of the fruit pulp. It is well known that some fruits (apples and citrus fruit) are more acid than others (pear, apricot, peach) and the choice of cloudyfying-enzymes may be adapted accordingly.

The amount of endoglucanase that may be added in the process of making cloudy juices is not very critical; in order to obtain a juice by partial liquefaction (hereinafter sometimes referred to as "cloudyfaction") sufficient endoglucanase must be present to achieve disintegration of the fruit or vegetable raw material. It Is preferable to add endoglucanase enzyme on the basis of CMCase activity, as the amount of xyloglucanase activity is of far less importance, if at all. Generally, the amount should be above 1 mU CMCase activity per gram fruit or vegetable material, preferably more than 5 mU CMCase per g vegetable material, still more preferably more than 10 mU CMCase activity per g vegetable material. In the specific embodiments, the amount of endoglucanase varies between 15 mU and 30 mU per a vegetable material; however, these values are arbitrary, as a ten-fold increase of CMCase activity did not have a negative effect on cloud stability. It is envisaged that the upper limit, at least in an industrial process, is reached due to commercial considerations such as enzyme cost price, rather than due to technological considerations.

The amount of pectin lyase may be determined empirically, but :will as a general rule be between 1 mU and 1 U per gram fruit or vegetable material, more typically between 10 and 100 mU/g. Should pectin esterase or polygalacturonase be used, suitable amounts may be determined empirically by the person having ordinary skill In the art.

In order to get a cloudy juice with attractive appearance the amount of cloud material and amount of liquid should be chosen such as to obtain a cloud volume which is equal to the total volume (100 % cloud occupancy). These amounts may easily be determined empirically; in the case of a cloudy apple juice according to the invention, it was determined that 5 mg cloud material in a total volume of 3 ml occupies about 45% of the total juice volume. In order to obtain a cloud occupancy of 100% the liquid phase should be reduced. Alternatively more concentrated cloud material can be added until the cloud occupancy reaches 100%. The cloud material according to the invention can be stored in highly concentrated form without precipitation problems, even for very long times.

If the cloud material is totally dried in the absence of protective agents it does not resume its original configuration upon rehydration and loses the properties which make it attractive for the fruit juice industry. It may be possible to dry cloud material in the presence of protective agents such as trehalose or sucrose, without such negative effects.

Obviously, the minimum amount of cloud material needed in a cloudy juice to obtain 100% cloud occupancy may be exceeded several fold according to the wishes of the juice manufacturers or the consumers. Hence, high density cloudy juice concentrates may be offered to the juice manufacturers for further processing. Similarly, stable cloudy juices with a very high optical density (or a low transmission) may be offered to the consumer.

The invention is especially useful to make cloudy juices from pomaceous fruit, such as apples and pears, but the method also finds use in the manufacture of cloudy juices, or cloudy juice concentrates, from other fruit.

A cloud according to the invention is meant to indicate that the transmission at $OD_{660}$ is less than a clear apple juice, preferably less than 90%, more preferably less than 80% still more preferably less than 50% of (commercially available) clear apple juice. A cloud according to the invention is distinguished from the phenomenon of "chill haze", which has a different composition in terms of sugars, especially by the high (more than 40mol %) arabinose content. Furthermore, chill haze, as the name indicates is a temperature dependent phenomenon (it disappears at room temperature and appears upon cooling) whereas the cloud according to the invention is not temperature dependent in temperature range +40° C. to room temperature. The cloud according to the invention can further be characterised in that the sum of xyloglucan (consisting essentially of Glucose, Xylose, Galactose and Fucose) and cellulose (characterised by its very high Glucose) amounts to more than 50% (w/w) . The cloudy material consists of particles, having a diameter of between 100 and 1000 μm, more typically between 100 and 500 μm, still more typically between 200 and 300 μm, usually of about 250 μm. The larger particles consist of agglomerates of cells or cell remnants, or combinations thereof. The smallest particles consist essentially of single cells or cell remnants, surrounded by or partially surrounded, as the case may be, by cell walls which have at least been partially degraded by the action of the enzymes. The cloud according to the invention is in essence a different cloud than those known to exist in cloudy citrus fruit juices; the latter consist essentially of protein and pectin, and cannot be obtained by the methods according to the invention.

While the method is illustrated in greater detail for cloudy apple juice manufacturing, it will be clear to hose of skill In the art, that cloudy juices can be made from other fruits than apple, on a large scale, using the methods according to the invention. According to one embodiment cloudy material from apple juice isolated by a process according the invention can be added to a clear juice from another fruit, for example a non-pomaceous fruit. In the alternative, the method according to the invention is directly applied to other fruit material yielding cloudy fruit juices wherein the cloud is indigenous to the fruit. The fruit may be selected from any one or mixtures of apples, pears, berries (strawberry, raspberry, blue berry, red berry, cranberry, pineapple, citrus, such as orange or lemon, kiwi, peach, apricot, melon, coconut, and the like. Fruit in the context of this invention must be construed in a broad sense, so as to encompass vegetables, including but not limited to tomato, potato, carrot, beet, rice and the like.

Enzymes with an adverse effect on cloud stability as determined by the method according to the invention comprise cellobiohydrolase from *T. viride*. It is envisaged that other cellobiohydrolases have an adverse effect on cloud stability as well, but this may be tested.

According to a another embodiment of the invention, the presence of noctious enzymes (i.e. enzymes having a negative influence on cloud stability as defined herein), such as cellobiohydrolase from a *T. viride*, may also be inhibited or inactivated in addition to, or instead of, removal.

The invention is illustrated in greater detail by the following non-limiting examples.

Experimental

Enzymes.—Three endoglucanases (endo, endoIV, and endoV; EC 3.2.1.4) and CHB (previously referred to as exoIII; EC 3.-2.1.91) were purified to homogeneity from a commercial preparation derived from *Trichoderma viride* (Maxazyme Cl, Gist-brocades, Delft, The Netherlands) as described by Beldman et al. (1985, Eur. J. Biochem. 146, 301–308). A novel cellulase from *Aspergillus niger*—CelA—has been identified and produced in *K. lactis* transformed with a cDNA encoding the enzymes, as described below.

Induction and isolation of mRNA—*A. niqer* N400 cultures were grown for 69 and 81 h respectively, as described In EP-A-0 463 706 but without yeast extract: and with 2% of a crude wheat arabinoxylan fraction instead of oat spelt xylan, after which the mycelium was harvested by filtration and then washed with sterile saline. The mycelium was subsequently frozen in liquid nitrogen after which it was powdered using a Microdismembrator (Braun) . Total RNA was isolated from mycelial powder in accordance with the qaunidium thiocyanate/CsCl protocol described in Sambrook et al. (1989), except that the RNA was centrifuged twice using a CsCl gradient. Poly A$^+$ MRA was isolated from 5 mg of total RNA by oligo (dT)-cellulose chromatography (Aviv and Leder, 1972, Sambrook e: al., 1989) with the following modifications: SDS is omitted from all solutions and the loading buffer was supplemented with 9% (v/v) dimethylsulfoxide.

Construction of the cDNA library—cDNA was synthesized from 7 μg poly A$^+$ MRNA and ligated into bacteriophage lambda λ Uni-ZAP XR using the ZAP™-cDNA synthesis kit (Stratagene) according to the manufacturer's instructions. After ligation of the cDNA into Uni-ZAP XR vector-arms, the phage DNA was packaged using Packagene™ extracts (Promega) according to the manufacturer's instructions. Ligation of 120 ng cDNA in 1.2 Mg vector arms and subsequent packaging of the reaction mixture resulted in a primary library consisting of 3.5×10$^4$ recombinant phages. This primary library was amplified using *E. coli* XLI-Blue MRF', titrated and stored at 4° C.

Conversion of phases into phagemids—Phages were propagated by plating them in NZYCM topagarose containing 0.7% agarose on 85 mm diameter NZYCM (1.5% agar) plates as described by Maniatis et al. (Marnats et al. (1982): Molecular cloning, a laboratory manual, Cold Spring Harbor Laboratory, Cold Spring Harbor, N.Y. pp64) using *E. coli* BB4 as plating bacteria. After overnight incubation at 37° C. confluent plates were obtained from which the phages were eluted by adding 5 ml SM buffer and storing the plate for 2 hrs at 4° C. with intermittent shaking. After collection of the supernatant, the bacteria were removed from the solution by centrifugation at 4.000×g at 40° C. for 10 min. To the supernatant, 0.3% chloroform was added and the number of plaque forming units (pfu) was determined. The phage stock contained approximately 10$^{10}$ pfu/ml.

The recombinant Uni-ZAP XR clones containing A. niger cDNA were converted to Bluescript phagemids using superinfection with the filamentous helper phage EXASSIST™ and *E. coli* SOLR strain which are included in the cDNA synthesis kit from Stratagene, according to the manufacturer's instructions. For long term storage a glycerol stock containing about 100 colonies per μl of suspension was stored at −80° C.

Construction of an Aspergillus aculeatus cDNA expression library in *E. coli*.—An *A. aculeatus* CBS 101.43 expression library was constructed in a similar way to the *A. niger* library, described above. *A. aculeatus* CBS 101.43 was grown up in minimal medium containing Timberlake trace elements, 0.1% yeast extract and 1% soy okara for periods of 40, 52, 64 and 76 hrs at 30° C. Minimal medium contains per litre 6 g NaNO$_3$, 1,5 g KH$_2$PO$_4$, 0.5 g KCl and 0.5 9 MgSO$_4$.

From mycelium at 40 and 52 hrs total RNA and polyA$^+$ RNA was isolated as described above. From the cDNA library about 150,000 primary plaques were amplified. Phages were stored at a concentration of 2.2×10$^7$, pfu/ml. Phages were converted to phagemids as described in Example I. From 24 random clones plasmids were isolated. They all contained inserts varying in sizes between 0.6 and 2.0 kb.

Screening of a plasmid cDNA library for cellulase-producing colonies—The screening procedure is modified from Wood et al. (Methods in Enzymology 160, 59–74).

Plates containing 20 ml 2×TY, 0.2% CMC (Sigma C-4888), 1.5% agar and 100 μg ampicillin per ml. Cells are plated in an overlay of 5 ml containing about 200 colonies per plate. The overlay is kept at 50° C. and contains 2×TY, 0.2% CMC, 0.75% agar and 100 μg ampicillin per ml. Plates are covered with 5 ml 0.5% agarose, 0.2% CMC and 100 μg ampicillin per ml kept at 50° C.

Plates are dried and incubated for 48 hrs at 37° C. Next, 5 ml 0.1% Congo Red. (Aldrich no C8, 445.3) is poured on the plates. After staining for 1–2 hrs plates are destained with 5 ml 5M NaCl for 0.5–1 hrs.

About 12,000 colonies from *A. niger* cDNA library were plated. Screening on CMC resulted in 89 colonies giving a halo after staining with Congo Red. Colonies were subdivided in 3 classes with a large, intermediate and a small halo. From each class 3 colonies were grown up, plasmids isolated and cDNAs sequenced. All contained a full length cDNA copy. The plasmids fell into two separate classes. From each class a colony was deposited at the CBS, Baarn, the Netherlands. A colony giving a small halo was deposited on Aug. 3, 1995and designated CBS 589.95. A colony giving a large halo was deposited on Sep. 21, 1995 and designated CBS 662.95. The DNA sequences of the inserts are as shown in SEQ ID No. 1 and 3, respectively, of an application entitled "Fungal Cellulases" (Ref. PCT-2761), filed on Oct. 14, 1996 in the name of Gist-brocades, a copy of which is attached hereto.

Overexpression of cellulases in *K. lactis*—Construction of expression vectors—Starting vector pGBHSA20 contains the promoter and terminator sequence of the lactase gene (lac4) *K. lactis* and a G418 selection marker; a strain harbouring this plasmid has been deposited at the Central Bureau voor Schimmelcultures, Ooosterstraat 1, Baarn, The Netherlands, on Oct. 3, 1996, under accession number CBS 997.96. The present cDNA insert encoding HSA (human serum albumin) was replaced by cellulase encoding cDNA12 and cDNA64 from *A. niger*. For cloning the *A. niger* cDNA12, a 3' XhoI site was present. The 5' HindIII site was created by subcloning a KpnI/EcoRI fragment containing the full length cDNA12, in the corresponding sites of vector pMTL22P. Digestion with HindIII, adjacent to the EcoRI site of the cDNA, and a subsequent partial digestion with XhoI (cDNA12 contains an internal XhoI site) released a HindIII/XhoI fragment which was cloned in the unique HindIII/XhoI sites of pGBHSA20. The resulting construct, in which the HSA encoding cDNA was replaced by cDNA1, was named pCVlac12. The same cloning strategy was followed for cDNA64, eventually resulting in expression vector pCVlac64.

Transformation of *K. lactis*—Prior to transformation, vectors pCVlac12 and pCVlac64 were linearized with HpaI having a unique site in the lactase promoter which is required for homologous integration. *K. lactis* strain CBS2359 was transformed with 15 µg vector DNA using the LiCl method as described by Ito et al. (1983, J. Bact. 153, 163–168). Transformants were selected on YePD plates (10 g/l yeast extract, 20 g/l Bacto-peptone, 20 g/l glucose, 20 g/l Bacto-agar) containing 50 µg/ml G418.

Screening for cellulase croducina *K. lactis* transformants *K. lactis*—transformants were screened for expression of the cellulases 12 and 64 in an enzyme assay using Cellazyme C tablets containing AZCL-hemicellulose colour complex (Megazyme, Australia). Cellulases release a blue AZCL compound which can be quantified by measuring the absorbance at 590 nm. To determine the cellulase activity in culture filtrate, transformants were grown in YePD at 30° C., 200 rpm, overnight. Next day culture fluid was harvested by pelleting the cells by centrifuqation. Cellulase activity in the supernatant was variable for independent transformants and cDNA64 containing transformants showed very low levels of enzyme activity compared to the cDNA12 transformants.

Expression of the cellulase cDNAs was enhanced when transformants were grown on lactose instead of glucose.

Mass production of cellulase—*K. lactis* transformants containing the pCVlac1 or pCVlac64 construct and with highest cellulase activity as determined in the above mentioned assays, were grown in 1 liter of YeP with 2% lactose, at 30° C., 200 rpm during two days. Subsequently cells were pelleted by centrifugation and the supernatant was harvested for further characterization of enzyme activities.

Characterization of cloned cellulases from Aspergillus—Determination of enzyme activity—The activity of the products from pCVlac1 (L12—CelA) and pCVlac64 (L64—CelB) towards CMC, xyloglucan and β-lucan was determined by treating 250 µg of the substrate in 200 µL of a 50 mM NaCAc buffer pH 5 containing 0.01% (w/v) NaN$_3$ for 1 h at 40 ° C. The release of reducing end groups was measured according to the method of Nelson-Somogyl et al. (1952) J. Biol. Chem. 195, 19–23.

|  | CMC | Xyloglucan | β-glucan |
| --- | --- | --- | --- |
| clone 12 | 600 | 29 | 1923 |
| clone 64 | 458 | 57 | 729 |

Determination of pH optimum—The pH optimum of L12 and L64 was determined using viscosity reduction.

Sample preparation—Culture filtrate were taken from *K. lactis* CBS2359 containing (pCVlac12)T10 and *K. lactis* CBS2359 containing (pVClac64)T41. Samples were concentrated by ultrafiltration prior to use.

L12 (CelA) was used for cloudyfaction.

The cloning of CDNA into expression cassette, transformation of *K. lactis* and overproduction of *A. aculeatus* endoglucanase egII and egIII can be done fully analogous to the procedure followed for the endoglucanases from *A. niger*.

PL (EC 4.2.2.10) was purified to apparent homogeneity from a commercial preparation derived from *Aspergillus niger* (Ultra-zym 100, Ciba-Geigy, now available from Novo Ferment AG, Basel, Switzerland) as described by Van Houdenhoven (1975, PhD Thesis, Study on pectin lyases, Wageningen Agricultural University, The Netherlands)

Raw materials and substrates.—Apples (*Malus malus* L., cv. Jonagold) were obtained at the local market. Carboxymethyl cellulose (CMC; Akuce 1 AF type 0305) was obtained from Akzo (Arnhem, The Netherlands) . Tamarind seed xyloglucan was kindly provided by Dainippon Pharmaceutical (Osaka, Japan) . Glc and ceiobiose were obtained from Merck (Darmstadt, Germany).

Determination of enzyme activities.—The activity of Maxazyme and of the various endoglucanases towards CMC and xyloglucan was determined by treating 250 µg of the substrate in 200 µL of a 50 mM NaOAc buffer pH 5 containing 0.01% (w/v) NaN$_3$ for 1 h at 40° C. The release of reducing end groups was measured according to the method of Somogyi (1952, J. Biol. Chem. 195, 19–23).

Analytical methods.—Sugar composition, molecular weight distributions (HPSEC), protein content, cellulose and xylogluan degradation products (HPAEC) were determined as described before (Vincken et al., 1996 (PhD thesis Ch. 8, supra; relevant parts of this chapter are incorporated herein by reference).

EXAMPLE 1

Activity of the Endoglucanases towards CMC and Xyloglucan

Table 1 lists a number of properties of the various endoclucanases.

TABLE 1

Some properties of different endoglucanases and their activity towards CMC and xyloglucan.

| Enzyme | Mol wt (kDa) | pI | pH opt. | CMC (mU mg$^{-1}$) | Xyloglucan (mU mg$^{-1}$) |
| --- | --- | --- | --- | --- | --- |
| *Trichoderma viride* | | | | | |
| Maxazyme | na.* | na. | na. | 30,190 | 29,736 |
| endoI | 50$^s$ | 5.3$^s$ | 5 | 1,142 | <<10 |
| endoIV | 24$^s$ | 7.7$^s$ | 5 | 26,672 | 37,079 |
| endoV | 57$^s$ | 4.4$^s$ | 5 | 1,370 | 1,640 |
| *Aspergillus aculeatus* | | | | | |
| egII | 35$^t$ | 3.4$^t$ | 3$^t$ | n.d. | n.d. |
| egIII | 26$^t$ | 5.5$^t$ | 5$^t$ | n.d. | n.d. |
| *Aspergillus niger* | | | | | |
| CelA | 26$^U$ | 4.2$^U$ | 3.5 | 600 | 29 |
| CelB | n.d. | n.d. | 3.5 | 458 | 57 |

*Not applicable; $^s$Values according to Beldman et al. (1985, Eur. J. Biochem. 146, 301–308); $^t$Values according to Dalboege et al. (1994, WO 94/14953); $^U$Values calculated from the amino acid sequence. n.d. not determined.

Endo IV (*Trichoderma viride*) and CelA (*Aspergillus niger*) are low-molecular-weight endoglucanases. EndoI and endoV from *Trichoderma viride* have a much higher molecular weight. Most of the endoglucanases have pI values between 4 and 6, except for endoIV (pI=7.7) and egII (pI=3.4). The pH optimum for most of the endoglucanases is around 5; egII is different in this respect and has a pH optimum of 3. The enzymes differ largely in their specificity for CMC and xyloglucan. In fact, three groups of endoglucanases can be distinguished:

(i) has a high CMCase and a low xyloglucanase activity (endoI, CelA);

(ii) has a low CMCase and a high xyloglucanase activity (egII), and (iii) has activity towards both substrates (endoIV, endoV, egIII).

Cloudyfaction experiments have been successfully performed using the endoglucanases/CMCases from group (i) and (iii), as described below; The usefulness of the CMCase from group (ii) remains to be tested.

EXAMPLE 2

Small Scale Cloudy Apple Juice Production

After removing the peel and core, apples were homogenized in a Braun kitchen machine (MX32, Frankfurt, Germany; 5 mm blade). One g of apple was incubated (40° C.; 150 rpm) with 3 mL of a 200 mM NaOAc buffer (pH 4) containing 0.01% (w/v) $NaN_3$, 1% (w/v) ascorbic acid, 50 mU PL and an amount of glucanase preparations which was equivalent to 17 mU of CMCase activity (endoIV), 21 mU of CMCase activity (endoV), 25 mU CMCase activity (Maxazyme) 29 mU CMCase activity (endoI and CelA). After 24 h, the extent of disintegration was evaluated visually.

All endoglucanases tested were able to disintegrate apple tissue in combination with PL (Table 2).

TABLE 2

Ability of different endoglucanases to disintegrate apple fruit tissue in combination with PL.

| Enzyme | disintegration |
|---|---|
| endoI | yes |
| endoIV | yes |
| endoV | yes |
| CelA | yes |
| CelB | yes |

In each case where disintegration was obtained with PL and an individual endoglucanase a cloudy juice was obtained.

Incubations with no enzyme added, as well as PL or Maxazyme alone, did not show any degradation so the apple tissue at all.

A combination of PL and Maxazyme (which contains endoglucanases and cellobiohydrolase) gave a much further degradation than was the case with combinations of PL with each of the individual endoglucanases; an almost clear juice was obtained.

In all trials where a cloudy juice was obtained the cloud volume was adjusted to a volume of 100% relative to the total juice volume. The cloudy juices remained stable (no sign of reduced cloud occupancy) for several months, which shows that one of the objects of the present invention, providing fruit juices which can remain on the shelves in the super market without losing their visual attractiveness, is achieved.

In conclusion all endoglucanases tested were capable in combination with pectin lyase of producing a cloudy apple juice as long as no cellobiohydrolase is present. This is concluded from the trial with PL and Maxazyme (a combination of endoglucanases, cellobiohydrolases and glucosidases).

EXAMPLE 4

Large Scale Preparation of Cloudy Apple Juice and Cloud Analysis

A cloudyfaction experiment was performed on a larger scale, under similar conditions as in Example 1. In this case 92.5 a of apple was used, and enzyme dosage was adjusted accordingly.

The cloud material was recovered as follows. The juice was removed from the incubation mixture, and the remaining apple pieces were washed twice with distilled water. The cloud material in the juice was precipitated by centrifugation (2 min, 3000 g). After removing most of the supernatant, the cloud material was resuspended in distilled water, and centrifuged again. This washing procedure was repeated until the supernatant was a clear liquid. Finally, the cloud material was resuspended and stored at 40° C. in a solution containing 2.85 mg cloud $mL^{-1}$ and 0.01% (w/v) $NaN_3$.

The cloudy suspension when adjusted to a cloud volume of 100% relative to total juice volume of 100% remained stable (there was no sign of a reduction in cloud occupancy) for several weeks (in fact till the end of the experiment).

EXAMPLE 5

Composition of the Cloud Material

Cloud material (100 mg) obtained with PL and endoIV according to Example 2 was extracted (20° C.) with solutions (50 mL) of respectively 1 M KOH and 4 M KOH, containing 1% (w/w) Na $BH_4$, as described before (Vincken et al., 1994, Plant. Physiol. 104, 99–107). Fractions so obtained were degraded with various glucanases including CBH for sugar analysis.

The cloud particles have a diameter of approximately 250μm. Approximately 75% (w/w) of the cloud is composed of sugars, of which 80% can be attributed to the cellulose-xyloglucan network. The cloud material was subjected to a series of extractins. Approximately 85% (w/w) was recovered in four fractions: 1 KOH (25 mg), 4 M KOH (15 mg), and a residue (45 mg). The sugar composition of the different fractions is shown in Table 3.

TABLE 3

Composition (mol %) of cloud material and fractions obtained by sequential extraction with alkali.

| | Rha | Fuc | Ara | Xyl | Man | Gal | Glc | GalA |
|---|---|---|---|---|---|---|---|---|
| Cloud | 2 | 2 | 5 | 11 | 3 | 4 | 64 | 9 |
| 1 M KOH | tr | 3 | 15 | 24 | 3 | 13 | 18 | 24 |
| 4 M KOH | tr | 6 | tr | 30 | 4 | 10 | 43 | 7 |
| Residue | tr | 0 | 0 | tr | 4 | 1 | 90 | 5 | tr = traces

The 1 M KOH fraction contained the major part of the pectic polysaccharides, and a substantial part of the xyloglucan molecules. The 4 M KOH extract consisted predominantly of xyloglucan.

HPSEC of the 1 and 4 M KOQ: extracts showed that the former was composed of two populations and the latter of only one. Both extracts were treated with endoV to investigate which population was composed of xyloglucan molecules. The digests were separated by HPSEC, and from shifts in mol wt distribution it was concluded that the xyloglucan molecules in the 4 M KOH extract were slightly larger than those in the 1 M KOH extract. Although the cloud has been obtained by using an endoglucanase, the xyloglucan molecules still have a high molecular weight. The molecules were much larger than ten-oligo-fragments.

EXAMPLE 6

Testing the Effect of Enzymes on Cloud Stability

In order to investigate whether the stability of the cloud material was influenced by the presence of different glucanases, the following experiment was carried out. Cloud material (5 mg) obtained according to the process described in Example 3 was suspended in 3 mL of 25 mM NaOAc buffer pH 5, containing 0.01% (w/v) $NaN_3$ and an appropriate amount of enzyme, and incubated at 40° C. for 16 h (head-over-tail mixing). Maxazyme, endoIV, endoV (25 mU of xyloglucanase activity added per incubation; which corresponds 17 mU CMCase activity in the case of endoIV, 21 mU CMCase for endoV) and endoI (5 µg added per incubation, which is equal to about 6 mU) were either added alone, or in combination with CBH (15 µg added per incubation). After 16 h, the suspensions were allowed to settle at 40° C., and after 24 h the cloud volume was evaluated. The clouds incubated without enzymes settled at a cloud volume of about 45% of the total volume. The incubations in the absence of CBH all yielded a cloud volume of approximately 45%, which is the same as the untreated cloud.

In the incubations which included CBH, the cloud volume was reduced to about 25% o the total volume, i.e. a reduction of about 45% (45–25)/45*100%).

Figure 2:
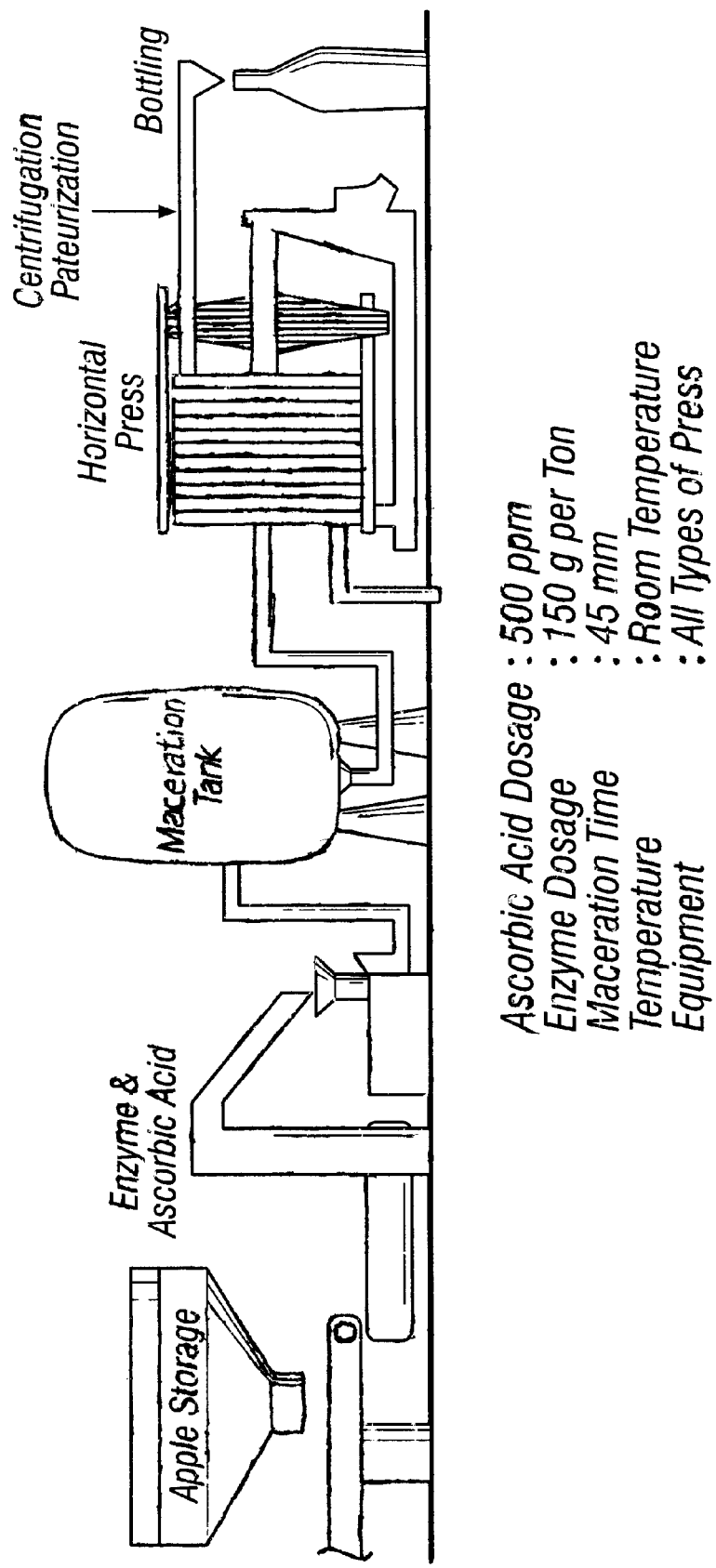
FIG. 2. General scheme for the cloudy apple juice manufacturing on an industrial scale.

Reaction products were analyzed by HPAEC. The cloud stability was not affected by treatment with endoglucanase. The optical density (expressed as % transmission) of endoglucanase-treated suspensions were similar to that of a blank (Table 4). The suspensions had a similar appearance (FIGS. 2A, B), and cloud particles did not seem to be degraded (FIGS. 2D, E). From these experiments it was concluded that the major part of xyloglucan is not accessible for endoglucanases, and that xyloglucan tails sticking out in solution are not important for the stability or the cloud. Addition of CBH to the cloud material has a detrimental effect on the stability of the suspension. The optical density decreases (Table 4) ; the transmission increases by about 60% (compare CBH to endoglucanase, and approximately 85% of the xyloglucan oligosaccharides are released. Apparently, CBH increases the accessibility of the xyloglucan molecules. The suspension has a different appearance. Larger agglomerates are formed (FIG. 1C), which precipitate quickly. These clouds have lost stability completely. It is not known what these larger structures are and why they are formed. Upon addition of CBH, the cloud particles lose their integrity (FIG. 1F).

So far, CBH is the only enzyme that is found to be detrimental to the cloud stability. This means that a cell wall degrading enzyme producing organism, such as a Trichoderma strain, in which the CBH genes are knocked out, may be used to produce a mixture of enzymes that can be readily used to manufacture cloudy fruit juices. Such a preparation might be an alternative for the use of highly purified or cloned enzymes having CMCase activity.

TABLE 4

Optical density and release of reaction products after treatment of isolated cloud material with various enzymes and combinations thereof.

|  | % T* | Glc[s] | cellobiose[s] | xyloglucan[s] |
| --- | --- | --- | --- | --- |
| Blank | 17 | 1.5 | 0.5 | 0 |
| Maxazyme | 32 | 29.7 | 3.9 | 3.6 |
| endoglucanase | 15 | 1.5 | 0.5 | 0.5 |
| CBH | 25 | 15 | 23 | 1.1 |
| endoglucanase + CBH | 26 | 17 | 23 | 3.0 |

*Optical density of the suspension was determined at 660 nm. % T refers to percentage transmission; an increase in transmission indicates cloud degradation. Blank: no enzyme added to the cloud suspension. [s]Arbitrary units. Digests of cloud material were analyzed by HPAEC, and peak areas for Glc, cellobiose, and the total amount of xyloglucan oligosaccharides (XXXG, XXFG, and XLFG) were determined by integration.

The fact that Maxazyme increases the transmission percentage of the cloud suspension more efficiently than endoglucanase +CBH is attributed to the presence of Siglucosidase in the Maxazyme preparation, causing cellobiose degradation which, in turn, is believed to reduce feedback inhibition of cellobiohydrolase.

In order to investigate which part of the xyloglucan molecules sticks out of the cloud particles, the cloud material was treated with the endoglucanases. The amount of xyloglucan oligosaccha,ides which was released by this treatment, was estimated using HPAEC. The total amount of xyloglucan oligosaccharides was estimated by degrading a similar amount of cloud to completeness with Maxazyme, and subsequently quantifying these oligosaccharides using HPAEC. All endoglucanases (except endoI) released 10–15% of the xyloglucan oligosaccharides present in the cloud particles (Table 4).

EXAMPLE 7

Cloudy Apple Juice Manufacturing on an Industrial Scale

A liquefaction experiment was performed on a industrial scale, starting from 1 ton of apples. Apples from Golden Delicious were sorted out and then ground with grinder type Bucher to obtain pulp particles of about 3 to 4 mm in size. Ascorbic acid was added during grinding at 500 ppm. Enzymes were added at the same time: the pectin lyase used previously was added at 50,000 units per ton apples; glucanase (endo IV) was added at 29,000 units per ton apples. The cloudyfaction was carried out during 45 minutes at room temperature (12 to 25° C.).

The liquefied pulp so obtained was centrifuged and pasteurised. The concentrate so obtained is ready for further processing by juice or soft drink manufacturers.

Alternatively, the cloud can be isolated and added to different fruit juices to obtain cloudy double (triple, etc.) fruit juices.

What is claimed is:

1. An enzyme preparation suitable for the preparation of cloud material from fruit or vegetable material comprising pectin lyase (EC 4.2.2.10) and endoglucanase (EC 3.2.1.4), wherein 1) the pectin lyase (EC 4.2.2.10) and endoglucanase (EC 3.2.1.4) are present in relative amounts to produce the cloud material, 2) the endoglucanase has both CMCase and xyloglucanase activity wherein the ratio of said CMCase activity to xyloglucanase activity is at least 0.7 and 3) the preparation does not contain enzymes which reduce the cloud volume, as determined by a calculated difference in relative cloud volumes or by optical density measurement at 660 nm, by more than 5%.

2. A composition comprising enzymes, wherein said composition exhibits homogalacturonan degrading activity and endoglucanase activity, said endoglucanase activity including both CMCase activity and xyloglucanase activity, these activities having a CMCase activity to xyloglucanase activity ratio of at least 0.7, wherein the enzyme exhibiting homogalacturonan degrading activity and the enzyme exhibiting endoglucanase activity are present in relative amounts to produce cloud material from fruit or vegetable material.

3. The enzyme preparation according to claim 1 or 2, wherein the endoglucanase has a pH optimum between 2 and 7.

4. The enzyme preparation according to claim 1 or 2, wherein the endoglucanase is selected from the group consisting of the endoI, endoIV, and endoV glucanases from *Trichoderma viride*, and CelA from *Aspergillus niger*.

* * * * *